Patented Feb. 4, 1936

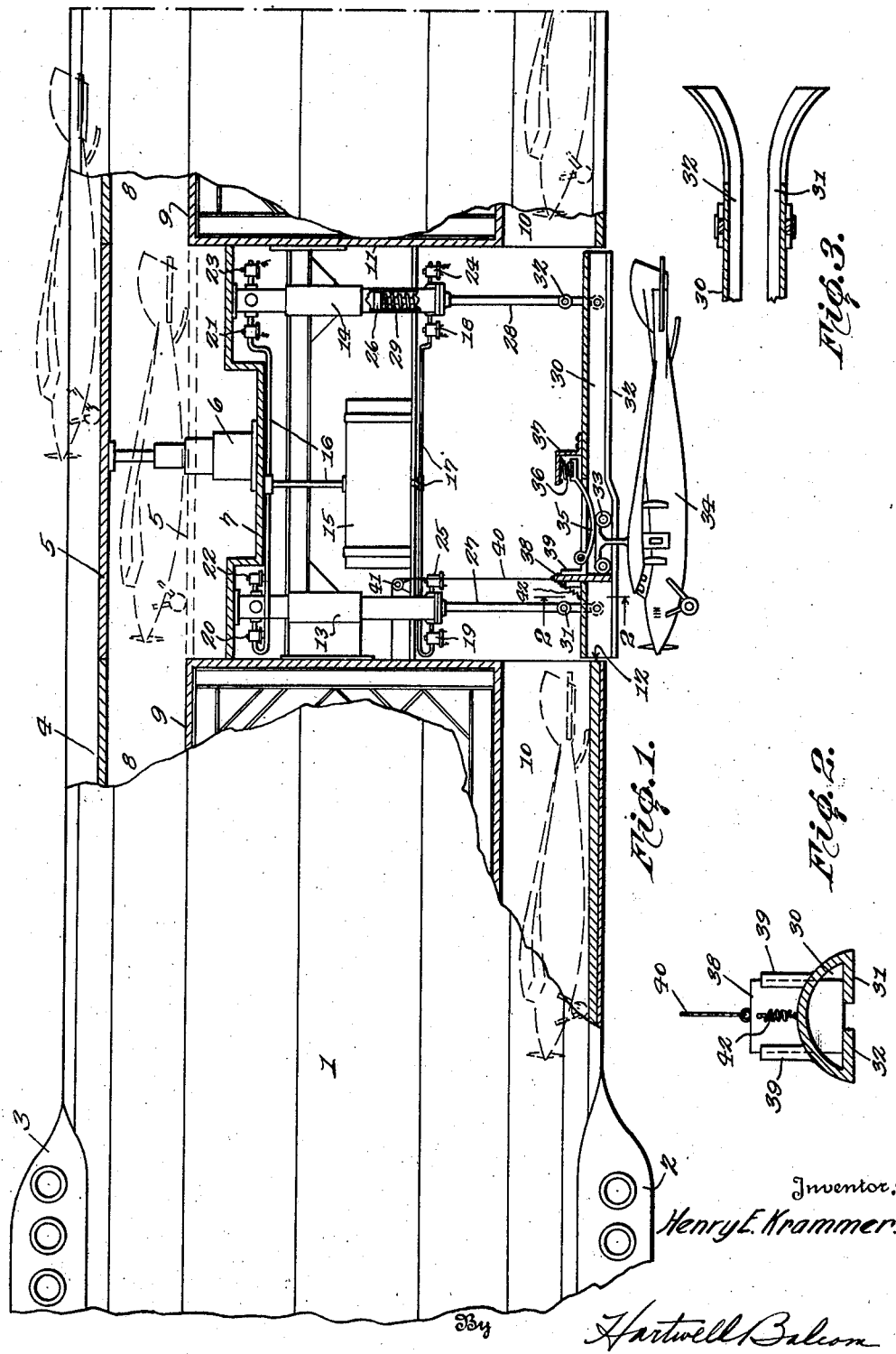

2,029,778

UNITED STATES PATENT OFFICE 2,029,778

AIRCRAFT

Henry E. Krammer, Hempstead, N. Y.

Original application July 15, 1931, Serial No. 551,037. Divided and this application July 11, 1933, Serial No. 679,974

11 Claims. (Cl. 244—2)

This invention relates to aircraft and the present disclosure is a division of my pending application, Serial Number 551,037, filed July 15, 1931.

The object of the invention is to provide a dirigible having a housing for airplanes in its lower portion, said dirigible being further provided with an aperture in its surface to permit the entrance and discharge of airplanes therethrough.

Another object is to provide a novel receiving and departure element for airplanes, said element including a longitudinally extending member to receive the landing element of an airplane.

Still another object is to provide means for shifting said receiving and departure element and an attached airplane in a vertical path through the aperture in said dirigible.

A still further object is to provide means for absorbing the landing shock of an airplane and to provide shiftable barrier means to hold an airplane in said receiving and departure element.

Another object of the invention is to provide a mother aircraft having means for receiving, discharging and housing aircrafts, under operation, in the upper and lower housings therewithin, and means wherein said aircrafts will also constitute an operable, auxiliary propulsive integral element, projectable and retractable for individual or combined contributory operations.

Another object is to provide a mother aircraft having an upper and a lower receiving and discharging element for aircrafts and means wherein said element will also constitute an operable disappearing propulsive platform, said platform having means wherein said aircrafts may be attached to said platform within the mother craft and be projected or retracted therefrom for combined or individual cooperative propulsive operations.

Still another object of the invention is to provide a mother aircraft having a retractable auxiliary propulsive element for cooperative or emergency operation, shiftable and detachable from the upper or lower housing under operation.

A still further object is to provide a mother aircraft having a receiving and departure element for airplanes in the upper surface and a shiftable and operable receiving and departure element for airplanes at the lower surface, shiftable and operable externally of said surface.

With these objects in view, together with others which will appear as the description proceeds, the invention resides in the novel formation, combination and arrangement of parts, all as will be described more fully hereinafter, illustrated in the drawing, and particularly pointed out in the claims.

In said drawing:

Figure 1 is a fragmentary view of a dirigible, with parts broken away, and partly in section, illustrating the details of my invention.

Fig. 2 is a sectional detail, slightly enlarged, as viewed on the line 2—2 of Fig. 1.

Fig. 3 is a fragmentary view showing the flared end of the airplane receiving and departure element.

Referring now more in detail to the accompanying drawing, wherein like characters of reference denote similar parts throughout the several views, let I indicate generally the dirigible provided with suitable propulsion means (not shown), and including a cabin 2 for the pilot and crew and another cabin 3 for passengers.

As shown in Figure 1 the upper portion of the dirigible is provided with a landing channel 4 similar to that shown in my Patent No. 1,672,163 dated June 5, 1928, in which airplanes may land or take off, the floor of said channel being provided with a platform 5 which is raised or lowered by means of a hoist arrangement 6 mounted on the floor 7.

From the foregoing it is obvious that an airplane landing in the channel 4 may be positioned on the platform 5 and then lowered into the dirigible for storage within the housing 8, as suggested by the broken-line showing of said planes. During the aforesaid operations the platform 5 is lowered flush with the floor 9 of the housing 8, (see broken-lines). The operations of handling the planes is, of course, reversed when placing a plane in position within the channel 4 for a take-off.

I also provide housings 10 in the lower portion of said dirigible, said housing extending forwardly and rearwardly from a pathway or section 11 which extends from the floor 7 to an aperture 12 formed in the exterior surface of said dirigible, said aperture being arranged for the purpose of receiving and discharging airplanes therethrough. In order that the airplanes, after having been attached to the receiving and departure element, may be hoisted through said aperture for transfer into the housings 10, certain novel means, about to be described, is employed for this purpose. Suitably anchored to the framing of said dirigible is a pair of cylinders 13 and 14, said cylinders being supplied with air from the tank 15 by way of piping 16 and 17, said piping 17 leading to electro-magnetic inlet valves 18 and 19, while piping 16 extends to electro-magnetic inlet valves 20 and 21, four exhaust valves 22, 23, 24 and 25 being provided for discharging the compressed air when a movement is necessary one way or the other, said valves being similar to those described in my Patent No. 1,579,370 dated April 6, 1926.

Each cylinder 13 and 14 is provided with a piston 26 as shown by cylinder 14 being broken away in Fig. 1. Rods 27 and 28 enter said cylinders 13 and 14, respectively, and each is provided with a piston 26, while that portion of said rods 27 and 28 within said cylinders is encircled by a spring 29 to absorb the landing shock of an airplane when the latter is coupled with the landing channel or frame 30, the said channel being supported by rods 27 and 28 which are preferably provided with swivel connections 31 and 32 at their outer ends.

Said landing channel 30 comprises spaced members 31 and 32 (see Fig. 2), which are flared at their ends as shown in Fig. 3 to facilitate the entrance of the upper landing gear 33 of an airplane 34 therein. It will be noted that said landing gear 33 slides along the members 31 and 32 until it encounters a brake arrangement 35, one end of said brake being under the tension of a spring 36 mounted in bracket 37. Further movement of said landing gear 33, and the airplane attached thereto, is restrained by means of a barrier 38 slidably mounted in guides 39. When the airplane 34 is in the position indicated in Fig. 1 it is only necessary to admit air into cylinders 13 and 14, by way of piping 17, whereupon the upward movement of the pistons 26, and rods 27 and 28, elevates the landing channel 30, and the attached airplane is passed through aperture 12 for transfer into either of the housings 10. The barrier 38 is, of course, first raised by means of the cable 40 passing over the pulley 41 as indicated. Normally said barrier 38 is held in the position shown by means of a spring 42.

From the foregoing it will be seen that the receiving and departure element operates in a vertical path through the aperture 12 and that the attached airplane is raised and lowered in a position substantially parallel to the horizontal axis of the dirigible.

In removing an airplane from the housing 10, the landing channel 30 is elevated to receive the landing gear 33 of the airplane, and after the barrier 38 has been elevated to permit the passage of said landing gear along the channel, and has further been lowered to hold said landing gear within the channel, the latter and its attached airplane are lowered through the aperture 12 to place said plane in a take-off position.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. An aircraft having a storage compartment in its lower portion, a vertically slidable hoist disposed in said compartment, and an airplane landing device actuated by said hoist, said device receiving and releasing an airplane when below the surface of said aircraft and receiving and discharging it into the storage compartment when raised.

2. An aircraft having a vertically slidable hoist within its lower portion, means for securing a propulsive element on said hoist and means for raising and lowering said element during the operation of said craft.

3. An aircraft having a housing within the lower portion thereof, a vertically slidable receiving and departure element for airplanes shiftable in a vertical path below and within said housing and means for actuating said element during the operation of said craft.

4. An aircraft having a receiving and departure element for airplines and means vertically slidable through the bottom of the aircraft whereby an airplane may depart and enter said craft during operation.

5. An aircraft having a housing for airplanes, a receiving and departure element for airplanes vertically slidable within and below said housing and substantially parallel with said craft, means for operating said element and means borne by said element for cushioning the movement of said element.

6. In an aircraft having an aperture in the bottom thereof, a frame for receiving and releasing an airplane, positioned within said aperture, vertically slidable means within said aircraft for extending and withdrawing the frame together with the received airplane within the contour of said aircraft.

7. In an aircraft having an aperture in the bottom thereof, a frame extendible through said aperture for receiving an airplane, vertically slidable means within said aircraft for withdrawing the frame together with the received airplane within the contour of said aircraft.

8. In an aircraft having an aperture in the bottom thereof, a frame extendible through said aperture and comprising spaced members for receiving an airplane, a tensioned brake borne by said frame to retard the movement of said airplane and vertically slidable means within said aircraft for extending and withdrawing the frame together with the received airplane within the contour of said aircraft.

9. In an aircraft having an aperture in the bottom thereof, a frame extendible through said aperture and comprising spaced members for receiving an airplane, a tensioned brake borne by said frame to retard the movement of said airplane, a movable barrier borne by said frame to arrest the forward movement of an airplane upon engagement with said frame and vertically slidable means within said aircraft for extending and withdrawing the received airplane within the contour of said aircraft.

10. In an aircraft having an aperture in the bottom thereof, a frame extendible through said aperture and comprising spaced members for receiving an airplane, a tensioned brake borne by said frame to retard the movement of said airplane and integral means within said aircraft for extending and withdrawing the frame together with the received airplane within the contour of said aircraft.

11. In an aircraft having an aperture in the bottom thereof, a frame extendible through said aperture and comprising spaced members for receiving an airplane, a tensioned brake borne by said frame to retard the movement of said airplane, a movable barrier borne by said frame to arrest the forward movement of an airplane upon engagement with said frame and integral means within said aircraft for extending and withdrawing the received airplane within the contour of said aircraft.

HENRY E. KRAMMER.